United States Patent
Ruperto

(10) Patent No.: US 9,596,357 B1
(45) Date of Patent: Mar. 14, 2017

(54) PHONE ACTIVITY TRACKING DEVICE

(71) Applicant: Netzer Ruperto, Chula Vista, CA (US)

(72) Inventor: Netzer Ruperto, Chula Vista, CA (US)

(*) Notice: Subject to any disclaimer, the term of this patent is extended or adjusted under 35 U.S.C. 154(b) by 0 days.

(21) Appl. No.: 14/871,969

(22) Filed: Sep. 30, 2015

Related U.S. Application Data

(60) Provisional application No. 62/071,690, filed on Oct. 1, 2014.

(51) Int. Cl.
- *H04L 29/08* (2006.01)
- *H04M 15/00* (2006.01)
- *H04W 4/04* (2009.01)
- *H04W 8/00* (2009.01)

(52) U.S. Cl.
CPC .......... *H04M 15/58* (2013.01); *H04L 67/10* (2013.01); *H04L 67/22* (2013.01); *H04W 4/04* (2013.01); *H04W 8/005* (2013.01)

(58) Field of Classification Search
CPC ........................................ H04L 67/22
See application file for complete search history.

(56) References Cited

U.S. PATENT DOCUMENTS

| | | | | |
|---|---|---|---|---|
| 8,712,628 B1* | 4/2014 | Hart | ............... | G06Q 10/08 701/1 |
| 8,787,936 B2* | 7/2014 | Tibbitts | ............... | H04W 48/04 455/456.1 |
| 2011/0093161 A1* | 4/2011 | Zhou | ............... | B60W 50/08 701/31.4 |
| 2011/0301839 A1* | 12/2011 | Pudar | ............... | H04W 4/046 701/408 |
| 2012/0161927 A1* | 6/2012 | Pierfelice | ............... | H04L 63/10 340/5.83 |
| 2012/0259665 A1* | 10/2012 | Pandhi | ............... | B60L 11/1809 705/4 |
| 2013/0006674 A1* | 1/2013 | Bowne | ............... | G06Q 10/0639 705/4 |
| 2013/0006715 A1* | 1/2013 | Warkentin | ............... | G06Q 10/0639 705/7.38 |
| 2013/0302758 A1* | 11/2013 | Wright | ............... | G07C 5/008 434/65 |
| 2014/0046701 A1* | 2/2014 | Steinberg | ............... | G06Q 40/08 705/4 |
| 2014/0058762 A1* | 2/2014 | Rude | ............... | G06Q 40/08 705/4 |
| 2015/0054934 A1* | 2/2015 | Haley | ............... | G06K 9/00845 348/78 |
| 2015/0365979 A1* | 12/2015 | Park | ............... | H04W 76/007 455/404.2 |
| 2016/0196613 A1* | 7/2016 | Miles | ............... | G06Q 40/08 705/4 |

* cited by examiner

*Primary Examiner* — Christopher M Brandt
(74) *Attorney, Agent, or Firm* — Evergreen Valley Law Group; Kanika Radhakrishnan

(57) ABSTRACT

A method and system for tracking usage of applications in handheld devices is disclosed. The method includes scanning for pre-connected devices present in a vehicle at the moment when the vehicle is in an ignition mode. Further, the method includes establishing connectivity with the pre-connected devices. Furthermore, the method includes recording usage data of the vehicle and usage data of the handheld device with a start time and end time. Moreover, the method includes uploading the recorded usage data in a cloud. The method also includes permitting one or more users to view the recorded usage data.

19 Claims, 5 Drawing Sheets

PHONE ACTIVITY TRACKING DEVICE

TECHNICAL FIELD

Embodiments of the disclosure relate generally to the field of tracking systems. Embodiments relate more particularly to a method and system to track activities in a handheld device while driving.

BACKGROUND

Since the introduction of mobile phones some, most often young people are texting or talking while driving. This activity distracts people from driving and therefore increases the risk of a car accident. This is why parents and insurance companies are interested in a texting and calling prevention or detection while driving. Another groups interested in this solution are fleet owners to check truck drivers and insurance groups allowing lower rates if this system is implemented.

The term texting is not only used for sending SMS (short message service) messages but it also includes texting in other applications like WhatsApp, Skype as well communicating over applications (WhatsApp, Skype etc.) and or regular telephone calls without using hands free operation, like a Bluetooth connection.

In the light of the above discussion, there appears to be a need for tracking activities in handheld devices while driving.

OBJECTIVE OF THE INVENTION

The primary objective of the invention is to monitor phone activities of drivers and passengers present in a vehicle while driving.

SUMMARY

The above-mentioned needs are met by a method and system for providing tracking usage of application in handheld devices.

An example of a method for tracking usage of applications in handheld devices is disclosed. The method includes scanning for pre-connected devices present in a vehicle at the moment when the vehicle is in an ignition mode. Further, the method includes establishing connectivity with the pre-connected devices. Furthermore, the method includes recording usage data of the vehicle and usage data of the handheld device with a start time and end time. Moreover, the method includes uploading the recorded usage data in a cloud. The method also includes permitting one or more users to view the recorded usage data.

An example of a system for tracking usage of applications in handheld devices. The system includes a vehicle operated by a driver and one or more passengers. The system also includes a plurality of handheld devices operated by the driver and passengers, the handheld devices are configured with a wireless technology. Further, the system includes a mobile network and an application server that is accessed by a plurality of users. Furthermore, the system includes a tracking device configured within the vehicle to track usage of applications in handheld devices present in the vehicle. Moreover, the system includes a processor configured within the tracking device and operable to perform: establishing connectivity with the pre-connected devices; recording usage data of the vehicle and usage data of the handheld device with a start time and end time; uploading the recorded usage data in a cloud and permitting one or more users to view the recorded usage data.

These and other aspect of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE VIEWS OF DRAWINGS

In the accompanying figures, similar reference numerals may refer to identical or functionally similar elements. These reference numerals are used in the detailed description to illustrate various embodiments and to explain various aspects and advantages of the present disclosure.

DETAILED DESCRIPTION OF THE EMBODIMENTS

The above-mentioned needs are met by a method and system for tracking phone activities. The following detailed description is intended to provide example implementations to one of ordinary skill in the art, and is not intended to limit the invention to the explicit disclosure, as one or ordinary skill in the art will understand that variations can be substituted that are within the scope of the invention as described.

Environment Block Diagram

Figure 1:
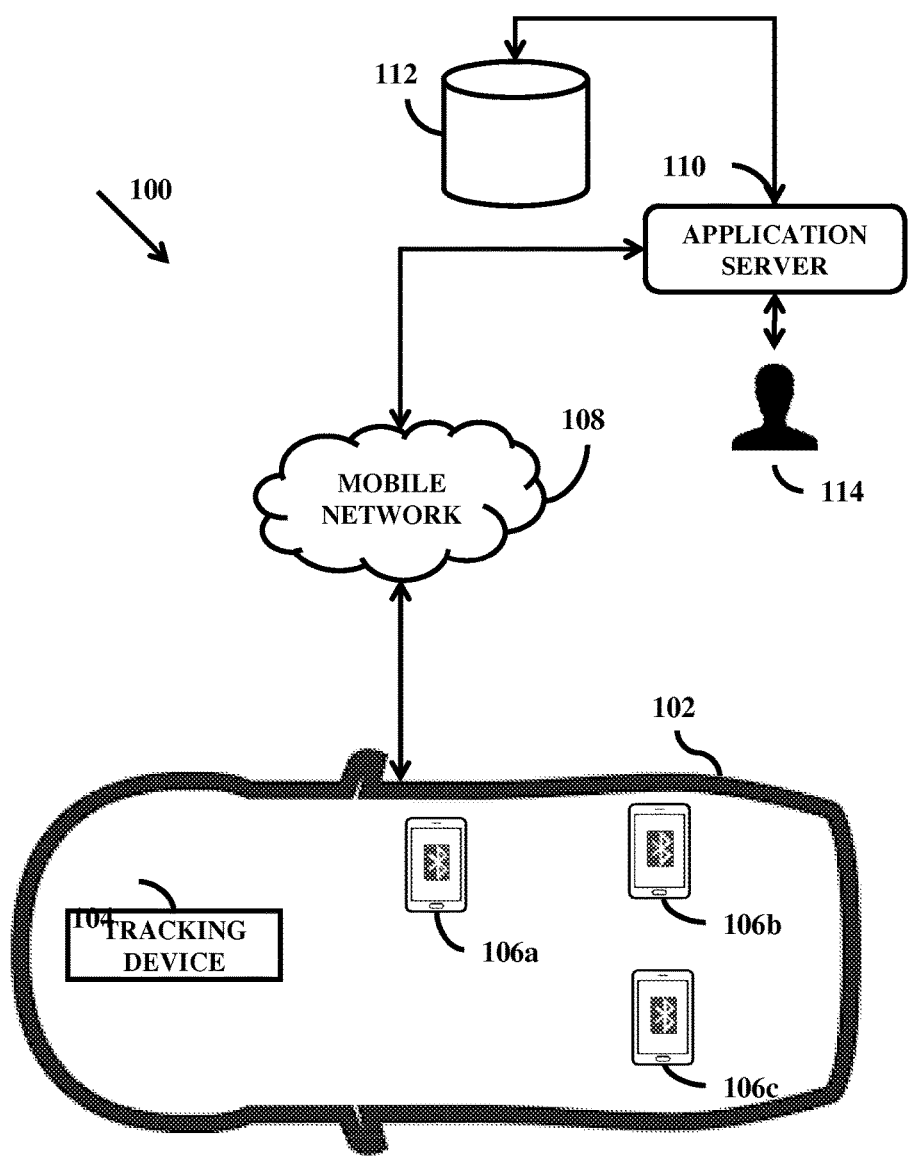
FIG. 1 is a block diagram of the environment, according to the embodiments as disclosed herein.

FIG. 1 is a block diagram of the environment, according to the embodiments as disclosed herein. The environment 100 includes a vehicle 102, a tracking device 104, a plurality of handheld devices, for example handheld device 106a, handheld device 106b and handheld device 106c, a mobile network 108, an application server 110, a database 112 and a user 114. In some embodiments, the environment 100 may include a plurality of users.

The tracking device 104 may also be referred to as "phone activity tracking device". Further, the tracking device 104 includes an accelerometer (not shown in FIG. 1) to detect sudden change in activities.

The vehicle 102 is a thing used for transporting people, especially on land, such as a car, a lorry or a cart. The vehicle 102 is operated by a driver (not shown in FIG. 1). Further, the vehicle 102 includes the tracking device 104 that is connected to an (OBDII) port as a pass through device of the vehicle 102. Potentially, other OBDII devices can be plugged into the OBDII port of the tracking device 104.

It will be appreciated to those skilled in the art that the tracking device 104 may be originally manufactured/integrated into the vehicle 102 by the vehicle's stereo or from the manufacturing point of the vehicle 102. The tracking device 104 may be integrated with the vehicle's manufacture components (for example, Bluetooth, Access point, modem or any other suitable GPS after market device) to perform the method described herein. In some embodiments, the vehicle 102 may have a modem and can use the modem to connect to the application server 110.

The handheld devices are small computing devices that used in one's hand. Typically, the handheld devices are portable computing device such as a cell phone, smart phone, Android devices and iOS devices. In some embodiments, the handheld devices may be replaced by desktops, laptops, notebooks, tablets and other types of wireless or wired computing devices suitable for this purpose. Further, the handheld device includes an operating system (OS) and runs several types of application software, known as "apps". The handheld devices are equipped with a wireless technology that allows connections to the Internet. The wireless technology typically uses radio waves to transmit and receive data. Examples of the wireless technology include, but are not limited to, Wi-Fi, WiMAX, Bluetooth and ZigBee.

It will be appreciated to those skilled in the art that the "handheld device" and "Bluetooth enabled device" may be interchangeably used.

The Bluetooth enabled Devices can be categorized as follows:
a) registered smart phones; which are devices which can be paired, for example a teenager's phone which have been paired with the tracking device 104.
b) unregistered phones, which are phones from either other teenagers or adults.

Further, the handheld devices are configured with a computer program product (code) referred to as "Activity Tracker application". This application limits the usage or restricts any applications on the handheld device while the tracking device 104 detects ignition "on" from the vehicle 102.

The mobile network (cellular network) 108 is a communication network where the last link is wireless. Network link(s) involved in the system of the present invention may include any suitable number or arrangement of interconnected networks including both wired and wireless networks. By way of example, a wireless communication network link over which mobile devices communicate may utilize a cellular-based communication infrastructure. The communication infrastructure includes cellular-based communication protocols such as AMPS, CDMA, TDMA, GSM (Global System for Mobile communications), iDEN, GPRS, EDGE (Enhanced Data rates for GSM Evolution), UMTS (Universal Mobile Telecommunications System), WCDMA and their variants, among others. In various embodiments, network link may further include, or alternately include, a variety of communication channels and networks such as WLAN/Wi-Fi, WiMAX, Wide Area Networks (WANs), and Blue-Tooth.

The application server 110 is a server program in a computer of a distributed network that handles all operations between the user 114 and the database 112. The database 112 stores all recorded information tracked by the tracking device 104. In some embodiments, the information can also be stored in the handheld device or in the tracking device 104 (thereby making the handheld device and tracking device self contained). The user 114 is a concerned person of the passengers travelling in the vehicle 102, for example parents, vehicle owner, fleet owners and insurances.

For the initial configuration one or more handheld devices need to be paired with the tracking device, this is typically done by the car owner or the owner of the handheld device. Once the car is in an ignition mode (while driving), the tracking device 104 scans the vehicle 102 for pre-connected handheld devices through a wireless technology. Specifically, the wireless technology is Bluetooth. Consequently, the tracking device 104 pairs with the scanned pre-connected handheld devices. Once paired, the tracking device 104 records the usage data of the vehicle 102 and the usage data of the handheld device. The tracking device 104 stores and records the usage data through a micro computer (not shown in FIG. 1). This recorded usage information is the uploaded to the cloud (application server 110) via a wireless modem (for example, CDMA or LTE) where the users can access the usage information by logging into a web browser. Further, the application layer can also be run on the handheld device or on the tracking device 104 implying that the application can run without the main database. The application can be a cloud base or self-contained application. In some embodiments, the recorded usage information may be uploaded to a data center.

An alternative method of synchronization includes the tracking device 104 identifying "on" and "off" of the vehicle and subsequently send the data to the database 112 without the synchronization of the handheld device. The handheld device can also send usage information to the database 112 without connection to tracking device 104. The database 112 has a timetable that can process the information sync. The application server can then update the usage on the web or handheld device app. This alternative method is performed when there is an interruption or simply an alternative method to sync information of the tracking device and mobile phone.

Networkblock Diagram

Figure 2:
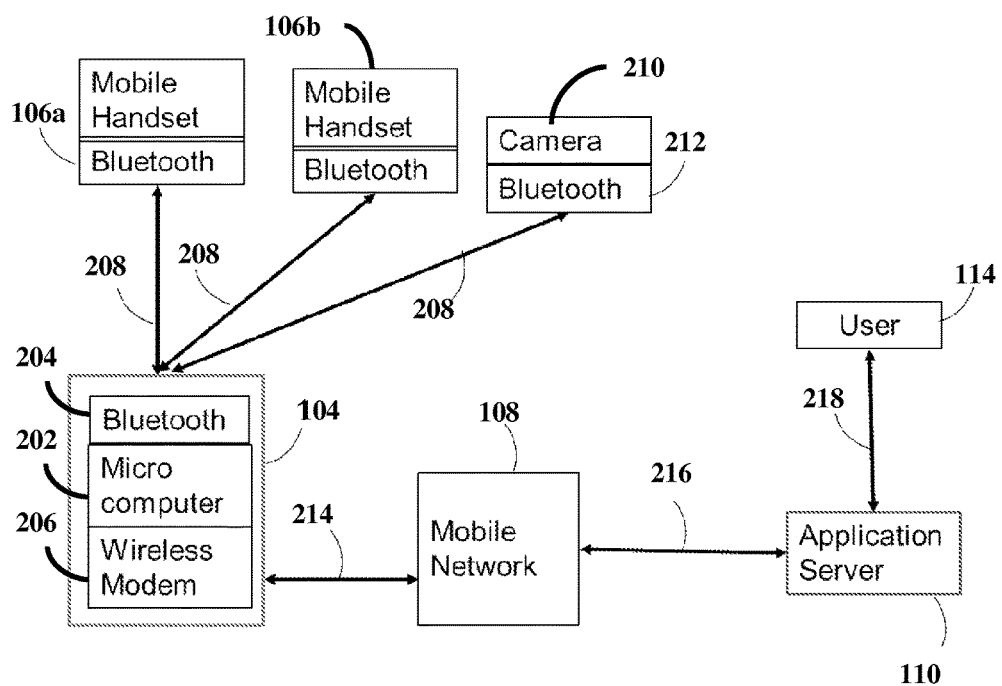
FIG. 2 is a block diagram of the network environment, according to the embodiments as disclosed herein.

FIG. 2 is a block diagram of the network environment, according to the embodiments as disclosed herein. Basically, the network environment illustrates network connections between the tracking device 104, mobile device 106a and mobile device 106b, a Camera Bluetooth device 210, a mobile network 108, the application server 110 and the user 114.

The tracking device 104 consists of a Microcomputer 202 which handles a Bluetooth unit 204, a Bluetooth unit 204 and a wireless modem 206. As soon as the car is in the "on" position the Bluetooth unit 204 will scan for all Bluetooth enabled devices, for example mobile handset 106a and mobile handset 106b within the car using a Bluetooth link 208. The Tracking Device 104 not only stores the Bluetooth enabled devices but it also will track which handheld device is using another Bluetooth connection, like the hands-free unit in the vehicle 102.

In certain scenarios, the tracking device 104 scans and identifies multiple registered handheld devices in the vehicle 102. In such a case, the activity tracker application on the handheld device will query all the registered handheld devices about the driver of the vehicle. As a result, other passengers in the vehicle would be allowed to utilize the handheld device capabilities completely.

Further the tracking device 104 will track all activities of several applications of the handheld devices and subsequently store it. These applications are not only "phone" applications, like regular call, skypeeBuddie, Viber, Tango, and other similar applications but also "texting" applications, like sms-messaging, whatsapptweet, contact+, Google Hangout and talk, Telegram Messanger, Line, WEchat, Viber, Tango, FaceBook Chat, VOIP Buster, BBM, iMessanger, Kikmessanger, ChatOnand similar applications as well as "video or photo" applications, like skype-video Instagram, Facetime, Google+hangouts, Snapchat, Flicker-and other similar applications.

The Camera Bluetooth device 210 can be installed optionally. Once, activities are tracked, the Tracking Device 104, triggers the Camera Bluetooth Device 210 to take a snap shot and transfers the data to the Tracking Device 104. The Camera Bluetooth Device 210 is typically installed in such a way that it can take a photo or a video of the head of the driver within the vehicle. Optionally it can also take pictures or videos of all persons in the vehicle. The photo would thereby validate the driver and the passengers of the vehicle. Further, the Camera Bluetooth Device 210 constantly records or picture frames to detect ongoing activities, so that at the time of a crash or an accident the Camera Bluetooth Device 210 can send a last recording of last "on" and "off" event.

The Tracking Device 104 can include a wireless modem, WIFI, BLE or other wireless access points, which can be based on GSM, CDMA, EVDO, UMTS, LTE or any other suitable cellular technology 214. A modem can be defined as a device or program that enables a computer to transmit data through communication lines. Once a trigger is reached the Tracking Device 104 sends the data over the Mobile Network 108 to the Application Server 110.

A trigger in the Tracking Device 104 can be reached if either a) the car is again in an "off" position or b) as soon as a phone activity has been detected.

The Application Server 110 will have the following information: start time (when car is in "on" position); stop time (when car was switched to "off position"), paired phone(s); number of unregistered phones; "phone", "text" and "video" activities with: list type application; Bluetooth connection (hands free devices were used), time, duration and optionally photos with time stamps. Video activities may be e-mailed to the users.

The Application Server 110 can be accessed via an Internet browser; after a login procedure the User 114 (parent, fleet owner or insurance company) can access the data of the Application Server 110. The Application Server 110 can also generate an email or text message to a predefined destination once an Application Server 110 threshold has been reached.

The Connection 216 can be with WIFI, access points, internal modem from tracking device 104 or the handheld device can send compiled data to the application server 110. Alternatively, the tracking device and the handheld device can send the usage information individually and the database 112 processes the information.

The User 114 can access the application server 110 by the connection 218 via the phone app or www.

The User 114 can configure the type of notification (email or text) as well as destination (email address or mobile number) and the threshold level (daily/weekly/monthly report; trip summary report (a summary of activities for the period On/Off-ignition of the car); every event (each single event; for example if for one trip there were 2 phone activities and 1 text activity, it would generate 3 notifications).

In some embodiments, instead of using a wireless modem or WIFI in the Tracking Device 104, the Tracking Device 104 can "push" the data through the paired phone and transfer the data over the Mobile Network 108 to the Application Server 110. This requires an application on the Bluetooth Enabled Device 106b which pairs it with the Tracking Device 104 and forwards the information to the Application Server 110 by using the Mobile Network 108 via GSM, CDMA, EVDO, UMTS or LTE. The advantage is a lower cost of the Tracking Device 104 but it requires an installation of an app on each registered phone.

Exemplary Scenario Case

Figure 3:
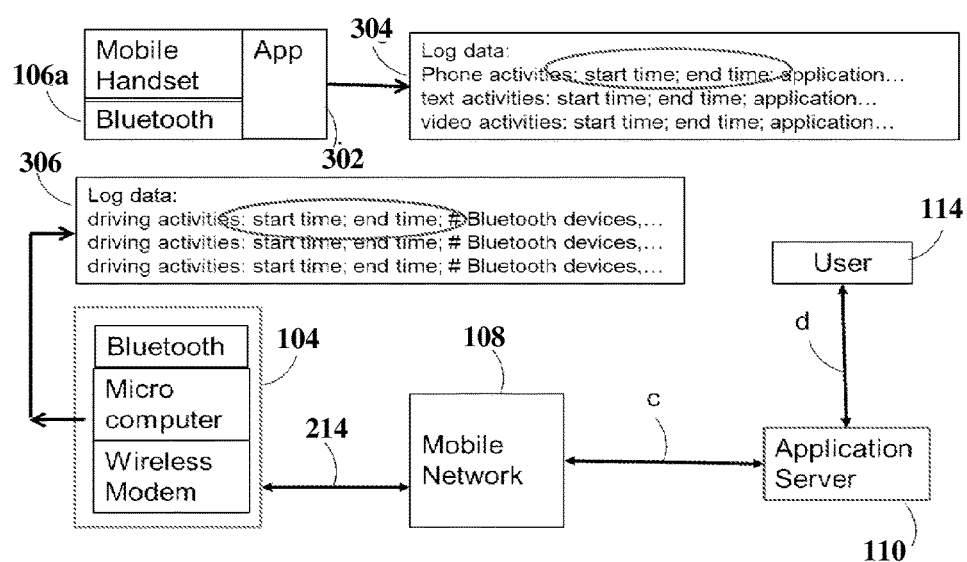
FIG. 3 illustrates an exemplary scenario when the registered phone has switched off Bluetooth, according to the embodiments as disclosed herein.

FIG. 3 illustrates an exemplary scenario when the registered phone has switched off Bluetooth, according to the embodiments as disclosed herein. The registered phone or phones have Bluetooth off (due to low battery or just trying to prevent communication) the preinstalled phone app 302 will continue to log and track phone usage with a start and end time 304 and the Tracking Device 104 will continue to log the on/off of the car while logging the activity with start and end time 306. At the time the Tracking Device 104 or mobile handset 106a can connect to the cloud server the logs will sync and data can be filtered. The communication to the cloud of Tracking Device 104 can either be through its wireless modem (link 214) or through the Bluetooth link 208 once the mobile handset 106a has switched on Bluetooth and is paired to the Tracking Device 104. The alternative method to connecting to the cloud and syncing information, may be sent separate, the phone can be preconfigured to send the phone usage information when not having Bluetooth. This can be upon action or scheduled to send phone usage to the cloud for (database filtering and compiling) once the data is in the cloud then the Tracking Device's log can be synced or pending to be synced, depending if time stamps are matched. In some embodiments, when the Tracking Device 104 is unable to a handheld device's usage, then the application server 110 can synchronize with the handheld device's wireless carrier to obtain the phone usage. At this point, the application server 110 synchronizes with the Tracking Device 104 "ignition on" usages and the phone usage, from carrier usage (for example, the network carrier of the handheld device is accessed with the user's permission, thereby providing access to the handheld device's network itemize usages. Typically, network carriers have Application Programming Interfaces (API's) or Virtual Private Network's (VPN's) that provides access to see phone usage. This phone usage would be call logs, sms logs and data logs).

Another embodiment is connecting the Tracking Device 104 not to the OBDII interface but using the "ignition on" cable as a power supply; like some car radios and other equipment are using.

Another embodiment is using GPS data to determine if the car is moving and therefore activating the Bluetooth scanning process. A GPS chip, GPS processor or push pass through OBD device's GPS function can be integrated into the Tracking Device 104.

In another embodiment, as the vehicle enters or exits areas of Wi-Fi, RF or Cellular coverage towers, the vehicle's status changes correspondingly.

Operational Flow Diagram

Figure 4:
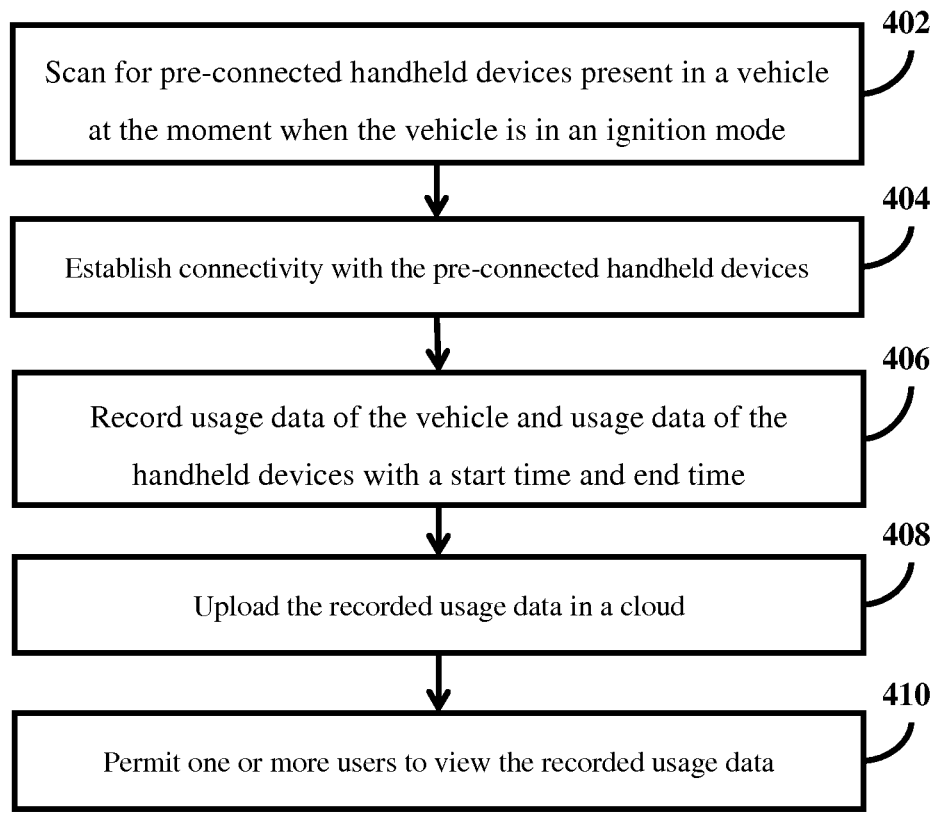
FIG. 4 is a flow diagram illustrating a method to track phone activities, according to the embodiments as disclosed herein.

FIG. 4 is a flow diagram illustrating a method to track phone activities, according to the embodiments as disclosed herein. The method begins at step 402.

At step 402, pre-connected handheld devices present in a vehicle are scanned at the moment when the vehicle is in an ignition mode.

At step 404, connectivity is established with the pre-connected handheld devices.

At step 406, usage data of the vehicle and usage data of the handheld devices are recorded with a start time and end time. The usage data of several applications are recorded on the handheld devices. The applications may be games and social applications that are installed or preinstalled in the handheld devices.

Geographical information is retrieved from the pre-connected devices and subsequently included into the recorded usage data. The geographical information is obtained through GPS technology.

Further, usage information of one or more unauthorized devices present in the vehicle is recorded. The unauthorized devices are detected by the tracking device while scanning. The tracking device then scans the serial number, MAC address or unique number of the Bluetooth on the unauthorized devices.

In case of non-connectivity, the usage data of the vehicle and usage data of the handheld devices are recorded and once connectivity is re-established, the recorded usage data is synchronized with Wi-Fi, BLT or other wireless access portal or access points. In some embodiments, the synchronization can be done individually. The tracking device can send its recorded usage data and the handheld device can send the usage data at a later time and subsequently synchronize at a later time. Alternatively, the tracking device can send its usage data to the handheld device and then the handheld device can send the usage data to the cloud.

Specifically, when the handheld device cannot synchronize with the tracking device or the application server, then the application server can access the phone's carrier bill through an Application Programming Interface (API) or Virtual Private Network (VPN) or credentials to login into an account and synchronize with the tracking device.

At step 408, the recorded usage data is uploaded in a cloud.

A driver and one or more passengers present in the vehicle are validated by triggering a connected camera to capture a picture of the driver and the passengers. The trigger is sent by the tracking device. Further, the data from the captured picture is then transferred to the cloud.

In some embodiments, the tracking device may be connected to a wireless or wired breath analyzer. The breath analyzer may have an option for correct person identification. This can control the vehicle's ignition not to start.

Personal information of the driver and the passengers are stored in a corresponding record/account in the cloud.

Alerts are sent to the users based on preferences at the occurrence of pre-defined events. Further, regular reports are sent to the users, wherein the reports indicate the usage of applications on corresponding handheld devices. Typically, the reports are configured by the users.

At step 410, one or more users are permitted to view the recorded usage data thereby tracking the activities in the corresponding handheld devices.

The application configured in the handheld devices limits the usage of applications.

The method ends at step 410.

The method described herein is beneficial for several reasons as listed below:
1. The method avoids accidents by tracking/restricting activities on the handheld devices.
2. The system allows OBD port to be open to other products.
3. The method allows validation of the driver and passengers with the Bluetooth scanner and camera.
4. The method allows insurance companies to assure drivers are not using their mobile phone and offers discounts or increase rates.
5. The method promotes the fact that using mobile phones while driving is not safe.

System Block Diagram

Figure 5:
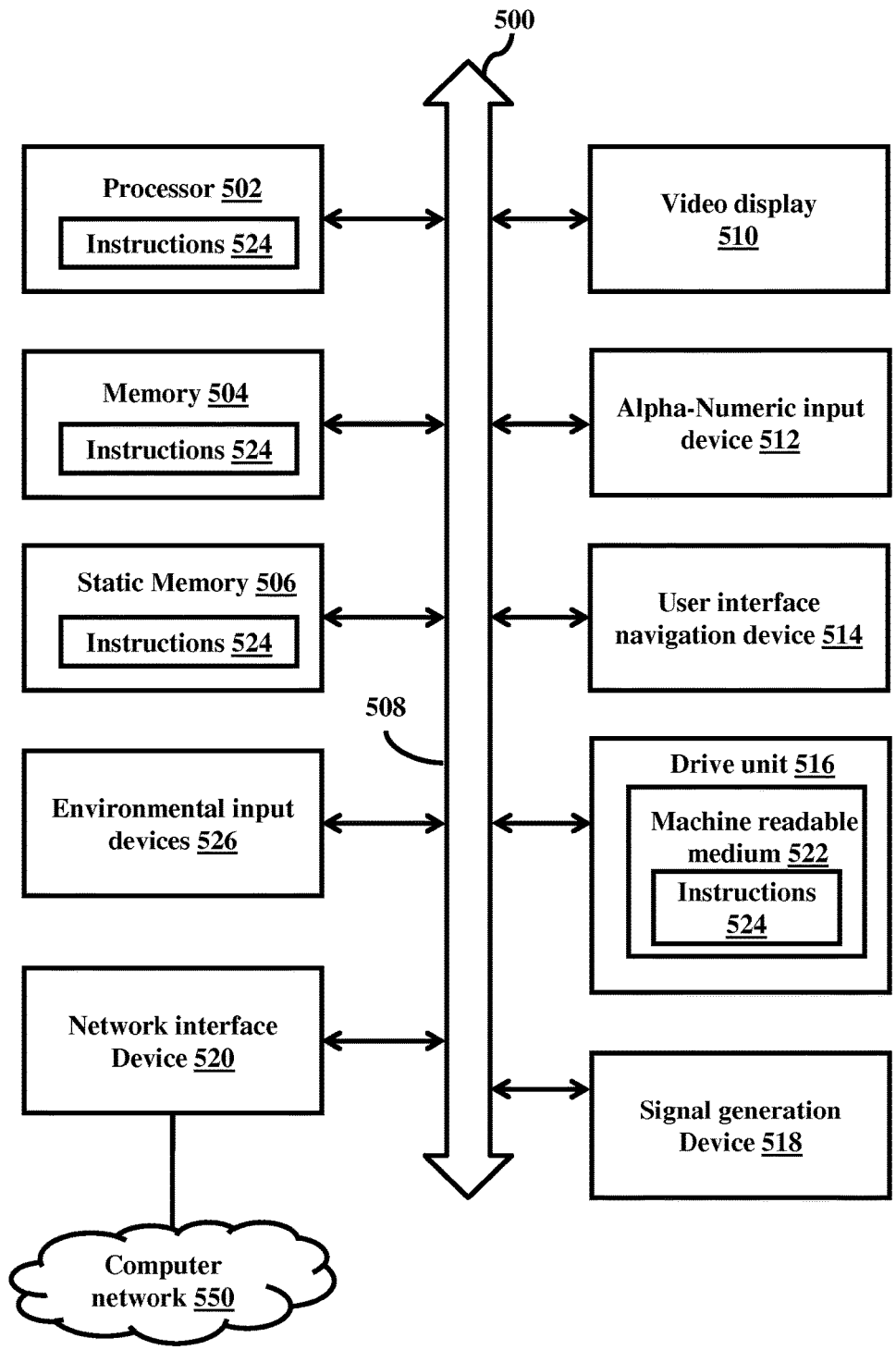
FIG. 5 is a block diagram of a machine in the example form of a computer system within which instructions for causing the machine to perform any one or more of the methodologies discussed herein may be executed.

FIG. 5 is a block diagram of a machine in the example form of a computer system 500 within which instructions for causing the machine to perform any one or more of the methodologies discussed herein may be executed. In alternative embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a Personal Digital Assistant (PDA), cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 500 includes a processor 502 (e.g., a central processing unit (CPU), a graphics processing unit (GPU), or both), a main memory 504, and a static memory 506, which communicate with each other via a bus 506. The computer system 506 may further include a video display unit (e.g., a liquid crystal displays (LCD) or a cathode ray tube (CRT)). The computer system 500 also includes an alphanumeric input device 512 (e.g., a keyboard), a user interface (UI) navigation device 514 (e.g., a mouse), a disk drive unit 516, a signal generation device 518 (e.g., a speaker), and a network interface device 520. The computer system 500 may also include a environmental input device 526 that may provide a number of inputs describing the environment in which the computer system 500 or another device exists, including, but not limited to, any of a Global Positioning Sensing (GPS) receiver, a temperature sensor, a light sensor, a still photo or video camera, an audio sensor (e.g., a microphone), a velocity sensor, a gyroscope, an accelerometer, and a compass.

Machine-Readable Medium

The disk drive unit 516 includes a machine-readable medium 522 on which is stored one or more sets of data structures and instructions 524 (e.g., software) embodying or utilized by any one or more of the methodologies or functions described herein. The instructions 524 may also reside, completely or at least partially, within the main memory 504 and/or within the processor 502 during execution thereof by the computer system 500, the main memory 504 and the processor 502 also constituting machine-readable media.

While the machine-readable medium 522 is shown in an example embodiment to be a single medium, the term "machine-readable medium" may include a single medium or multiple media (e.g., a centralized or distributed database, and/or associated caches and servers) that store the one or more instructions 524 or data structures. The term "non-transitory machine-readable medium" shall also be taken to include any tangible medium that is capable of storing, encoding, or carrying instructions for execution by the machine and that cause the machine to perform any one or more of the methodologies of the present subject matter, or that is capable of storing, encoding, or carrying data structures utilized by or associated with such instructions. The term "non-transitory machine-readable medium" shall accordingly be taken to include, but not be limited to, solid-state memories, and optical and magnetic media. Specific examples of non-transitory machine-readable media include, but are not limited to, non-volatile memory, including by way of example, semiconductor memory devices (e.g., Erasable Programmable Read-Only Memory (EPROM), Electrically Erasable Programmable Read-Only Memory (EEPROM), and flash memory devices), magnetic disks such as internal hard disks and removable disks, magneto-optical disks, and CD-ROM and DVD-ROM disks.

Transmission Medium

The instructions 524 may further be transmitted or received over a computer network 550 using a transmission medium. The instructions 524 may be transmitted using the network interface device 520 and any one of a number of well-known transfer protocols (e.g., HTTP). Examples of communication networks include a local area network (LAN), a wide area network (WAN), the Internet, mobile telephone networks, Plain Old Telephone Service (POTS) networks, and wireless data networks (e.g., Wi-Fi and WiMAX networks). The term "transmission medium" shall be taken to include any intangible medium that is capable of storing, encoding, or carrying instructions for execution by the machine, and includes digital or analog communications signals or other intangible media to facilitate communication of such software.

As described herein, computer software products can be written in any of various suitable programming languages, such as C, C++, C#, Pascal, Fortran, Perl, Matlab (from MathWorks), SAS, SPSS, JavaScript, AJAX, and Java. The computer software product can be an independent application with data input and data display modules. Alternatively, the computer software products can be classes that can be instantiated as distributed objects. The computer software products can also be component software, for example Java Beans (from Sun Microsystems) or Enterprise Java Beans (EJB from Sun Microsystems). Much functionality described herein can be implemented in computer software, computer hardware, or a combination.

Furthermore, a computer that is running the previously mentioned computer software can be connected to a network and can interface to other computers using the network. The network can be an intranet, internet, or the Internet, among others. The network can be a wired network (for example, using copper), telephone network, packet network, an optical network (for example, using optical fiber), or a wireless network, or a combination of such networks. For example, data and other information can be passed between the computer and components (or steps) of a system using a wireless network based on a protocol, for example Wi-Fi (IEEE standards 802.11, 802.11a, 802.11b, 802.11e, 802.11g, 802.11i, and 1802.11n). In one example, signals from the computer can be transferred, at least in part, wirelessly to components or other computers.

It is to be understood that although various components are illustrated herein as separate entities, each illustrated component represents a collection of functionalities which can be implemented as software, hardware, firmware or any combination of these. Where a component is implemented as software, it can be implemented as a standalone program, but can also be implemented in other ways, for example as part of a larger program, as a plurality of separate programs, as a kernel loadable module, as one or more device drivers or as one or more statically or dynamically linked libraries.

Furthermore, as will be apparent to one of ordinary skill in the relevant art, the portions, modules, agents, managers, components, functions, procedures, actions, layers, features, attributes, methodologies and other aspects of the invention can be implemented as software, hardware, firmware or any combination of the three. Of course, wherever a component of the present invention is implemented as software, the component can be implemented as a script, as a standalone program, as part of a larger program, as a plurality of separate scripts and/or programs, as a statically or dynamically linked library, as a kernel loadable module, as a device driver, and/or in every and any other way known now or in the future to those of skill in the art of computer programming. Additionally, the present invention is in no way limited to implementation in any specific programming language, or for any specific operating system or environment.

Furthermore, it will be readily apparent to those of ordinary skill in the relevant art that where the present invention is implemented in whole or in part in software, the software components thereof can be stored on computer readable media as computer program products. Any form of computer readable medium can be used in this context, such as magnetic or optical storage media. Additionally, software portions of the present invention can be instantiated (for example as object code or executable images) within the memory of any programmable computing device.

As will be understood by those familiar with the art, the invention may be embodied in other specific forms without departing from the spirit or essential characteristics thereof. Likewise, the particular naming and division of the portions, modules, agents, managers, components, functions, procedures, actions, layers, features, attributes, methodologies and other aspects are not mandatory or significant, and the mechanisms that implement the invention or its features may have different names, divisions and/or formats.

Accordingly, the disclosure of the present invention is intended to be illustrative, but not limiting, of the scope of the invention, which is set forth in the following claims.

What is claimed is:

1. A method for tracking usage of applications in a handheld device, the method comprising:
   scanning for pre-connected handheld devices present in a vehicle at the moment when the vehicle is in an ignition mode;
   establishing connectivity with the pre-connected handheld devices;
   recording usage data of the vehicle and usage data of the handheld devices with a start time and end time;
   uploading the recorded usage data in a cloud; and
   permitting one or more users to view the recorded usage data.

2. The method of claim 1 and further comprising:
   retrieving geographical information of the pre-connected handheld devices; and including the geographical information into the recorded usage data of the handheld devices.

3. The method of claim 1 and further comprising:
   recording usage information of one or more unauthorized handheld devices present in the vehicle.

4. The method of claim 1 and further comprising:
   validating a driver and one or more passengers present in the vehicle.

5. The method of claim 4 and further comprising:
   triggering a connected camera to capture one of a picture and a video of the driver and the passengers; and
   transferring the capture done of the one of a picture and a video and corresponding data to the cloud.

6. The method of claim 4 and further comprising:
   storing personal information of the driver and the passengers in a corresponding record in the cloud;

sending alerts based on preferences at the occurrence of pre-defined events; and limiting the usage of applications on the handheld devices.

7. The method of claim 6 and further comprising:

sending regular reports to concerned people, wherein the reports indicate the usage of applications on corresponding handheld devices and are configured by the users.

8. The method of claim 1 and further comprising:

recording usage data of the vehicle and usage data of the pre-connected handheld device with a start time and end time in a stretch of non-connectivity; and synchronizing the recorded usage data immediately upon connection.

9. A computer program product stored on a non-transitory computer-readable medium that when executed by a processor, performs a method for tracking usage of applications in a handheld device, the computer program product comprising:

scanning for pre-connected devices present in a vehicle at the moment when the vehicle is in an ignition mode;

establishing connectivity with the pre-connected devices;

recording usage data of the vehicle and usage data of the handheld device with a start time and end time;

uploading the recorded usage data in a cloud;

permitting one or more users to view the recorded usage data.

10. The computer program product of claim 9 and further comprising:

retrieving geographical information of the pre-connected handheld devices; and including the geographical information into the recorded usage data of the handheld devices.

11. The computer program product of claim 10 and further comprising:

recording usage information of one or more unauthorized handheld devices present in the vehicle.

12. The computer program product of claim 10 and further comprising: validating a driver and one or more passengers present in the vehicle.

13. The computer program product of claim 12 and further comprising:

triggering a connected camera to capture one of a picture and a video of the driver and the passengers; and transferring the captured one of a picture and video and corresponding data to the cloud.

14. The computer program product of claim 12 and further comprising:

storing personal information of the driver and the passengers in a corresponding record in the cloud;

sending alerts based on preferences at the occurrence of pre-defined events; and limiting the usage of applications on the handheld devices.

15. The computer program product of claim 13 and further comprising:

sending regular reports to concerned people, wherein the reports indicate the usage of applications on corresponding handheld devices and are configured by the users.

16. The computer program product of claim 10 and further comprising:

recording usage data of the vehicle and usage data of the pre-connected handheld device with a start time and end time in a stretch of non-connectivity; and synchronizing the recorded usage data immediately upon connection.

17. A system for tracking usage of applications in a handheld device, the system comprising:

a vehicle operated by a driver and one or more passengers;

a plurality of handheld devices operated by the driver and passengers, the handheld devices are configured with a wireless technology;

a mobile network;

an application server that is accessed by a plurality of users;

a tracking device configured within the vehicle to track usage of applications in handheld devices present in the vehicle; and a processor configured within the tracking device and operable to perform:

establishing connectivity with the pre-connected devices;

recording usage data of the vehicle and usage data of the handheld device with a start time and end time;

uploading the recorded usage data in a cloud;

permitting one or more users to view the recorded usage data.

18. The system of claim 17 wherein the tracking device further comprises:

a Bluetooth unit to scan for pre-connected handheld devices present in the vehicle at the moment when the vehicle is in an ignition mode;

a micro computer to handle the Bluetooth unit; and a wireless modem to transfer the recorded usage data over communication lines.

19. The system of claim 17 and further comprising:

a camera device configured with a wireless technology to capture one of a picture and a video of the driver and passengers in the vehicle and subsequently to transfer the one of a picture and a video to the tracking device.

* * * * *